United States Patent [19]

Dowd et al.

[11] Patent Number: 5,452,540
[45] Date of Patent: Sep. 26, 1995

[54] AUTOINOCULATING DEVICE FOR CONTAMINATING INSECTS WITH ACTIVE AGENTS

[75] Inventors: Patrick F. Dowd; Fernando E. Vega, both of Peoria, Ill.

[73] Assignee: The United States of America as represented by the Secretary of Agriculture, Washington, D.C.

[21] Appl. No.: 169,806

[22] Filed: Dec. 17, 1993

[51] Int. Cl.⁶ .................................................. A01M 1/20
[52] U.S. Cl. ........................................................... 43/107
[58] Field of Search .............................. 43/107, 122, 117, 43/118, 131

[56] References Cited

U.S. PATENT DOCUMENTS

| | | | |
|---|---|---|---|
| D. 324,406 | 3/1992 | Brefka | D22/122 |
| 1,772,729 | 8/1930 | Pisani | 43/107 |
| 1,772,989 | 8/1930 | Emley | 43/107 |
| 1,865,713 | 7/1932 | Taylor | 43/107 |
| 2,046,430 | 7/1936 | Rutherford | 43/107 |
| 2,997,806 | 8/1961 | Duvall | 43/121 |
| 3,803,753 | 4/1974 | Felgin et al. | 43/131 |
| 4,208,829 | 6/1980 | Manning | 43/131 |
| 4,485,582 | 12/1984 | Morris | 43/131 |
| 4,753,032 | 6/1988 | Sherman | 43/131 |
| 4,858,374 | 8/1989 | Clemons | 43/122 |
| 5,057,315 | 10/1991 | Gunner et al. | 424/93 |
| 5,057,316 | 10/1991 | Gunner et al. | 424/93 |
| 5,081,788 | 1/1992 | Dowd et al. | 43/107 |
| 5,090,153 | 2/1992 | Mullen et al. | 43/114 |
| 5,189,831 | 3/1993 | Miller et al. | 43/121 |
| 5,226,254 | 7/1993 | MacMenigall | 43/107 |
| 5,238,681 | 8/1993 | Chang et al. | 424/405 |
| 5,253,450 | 10/1993 | Muramatsu | 43/107 |
| 5,339,563 | 8/1994 | Job | 43/107 |

FOREIGN PATENT DOCUMENTS

| | | | |
|---|---|---|---|
| 3141865 | 5/1983 | Germany | 43/107 |
| 298750 | 10/1928 | United Kingdom | 43/107 |

OTHER PUBLICATIONS

Joel Grossman, "Entomological Society of America's 1992 Annual Meeting—Part II," IPM Practitioner XV(3):10 (Mar. 1993).

D. Michael Jackson, "Autodissemination of a Baculovirus for Management of Tobacco Budworms (Lepidoptera: Noctuidae) on Tobacco," J. Economic Entomology 85(3): 710–719 (Jun. 1992).

G. L. Nordin et al., "Autodissemination of Baculovirus for Suppression of Tobacco Budworm in Kentucky and North Carolina," Proc. Entomology Section of 33rd Tobacco Workers Conf., Nashville, Tenn., Jan. 9–12, 1989.

*Primary Examiner*—Mark Rosenbaum
*Assistant Examiner*—Chuck Y. Mah
*Attorney, Agent, or Firm*—M. Howard Silverstein; Curtis P. Ribando; John D. Fado

[57] ABSTRACT

A device for use with a funnel drop-type trap for autoinoculation of active agents with insects. The device comprises a collecting chamber, an entrance near the top of the chamber for entry of the insects from the trap and for direction of the insects to the agent positioned on the surface below the entrance. At least one exit for escape of the insects is located on the sidewall of the chamber.

13 Claims, 1 Drawing Sheet

AUTOINOCULATING DEVICE FOR CONTAMINATING INSECTS WITH ACTIVE AGENTS

BACKGROUND OF THE INVENTION

1. Field of the Invention

This invention relates to a device for disseminating an active agent for the control of pests or monitoring of an insect population. It is adapted for use in combination with an insect trap which captures the insects and directs them to the vicinity of the pathogen located within the device.

2. Description of the Prior Art

The concept of insect-vectored entomopathogen dissemination was described in the report of a study by Burkholder [*Chemical Control of Insect Behavior: Theory and Application*, Shorey and McKelvy, Jr. (ed.), John Wiley and Sons, Inc., pp. 345–351 (1977)] and Shapas et al. [*J. Econ. Entom.* 70: 469–474 (1977)]. In those reports, references were made to prior studies by McLaughlin [*J. Econ. Entomol.* 59: 909–911 (1966), *J. Invertebr. Pathol.* 13: 429–41 (1969) and *In Microbial Contol of Insects and Mites*, H. D Burgess et al., Academic, New York, pp. 151–172 (1971)] to use of protozoans for microbial control of insects, particularly the boll weevil. Burkholder and Shapas et al., supra, demonstrated that when male *Trogoderma Elabrum* (Herbst) beetles were drawn into a corrugated inoculation device treated with a component of a pheromone and dusting of Mattesia spores, over 95% of the test insects became contaminated with the protozoan.

Gunner et al. (U.S. Pat. Nos. 5,057,315 and 5,057,316) describe a method and device for control and extermination of a variety of insects, including roaches and flying insects by contact with cultures of an entomopathogenic agent. In the embodiment for treating roaches, the chamber is designed to be placed flat on the ground or other horizontal surface and to promote contact between the source of the pathogen and the back of the crawling insect. Insects are free to enter and exit through the same holes on the side of the chamber. The embodiment for treating flying insects, such as the housefly and little housefly, provides for a covered chamber which houses a fungal culture medium (see also Miller et al. U.S. Pat. No. 5,189,831). The interior of the chamber is accessible by means of holes on the side, through which the insects can freely enter or exit. Insects attracted to the medium are contacted with a fungal pathogen grown on the medium, though no structural means is provided to insure such contact.

In Design U.S. Pat. No. Des. 324,406, Brefka presents an ornamental design for an insect contamination chamber. The octagonal housing of the chamber comprises four portals for entry of crawling insects and a centrally located bait station.

Jackson et al. [*J. Econ. Encomol.*, 85: 710–719 (1992)] disclose a contamination station for autodissemination of a Baculovirus for management of the tobacco budworm. The station is designed to mount on the top of a wire-cone trap and has a bottom entrance for the flying adult moths. Inside the station, a series of baffles directs the insects into contact with the entomopathogen and out through the underside of a removable lid.

In U.S. Pat. No. 5,238,681, Chang et al. shows an insect bait station comprising a first compartment for holding a hydrated macrogel containing an entomopathogen and a second compartment containing a hydrated water retentive compound layer which acts as a water-reservoir for the entomopathogen. Attractants induce crawling insects to enter and exit the station through any of a series of portals near the bottom, whereupon then come into contact with the patbogen.

SUMMARY OF THE INVENTION

We have now discovered a device for autoinoculation of insects which are prone to capture in a vertical drop trap. The device comprises a chamber adapted to be secured below the trap. An entrance near the top of the chamber permits entry of the insects from the trap and gravitationally delivers the insects to the active agent positioned on the surface directly below the entrance. At least one exit for escape of the insects is located on the sidewall of the chamber.

Several embodiments are contemplated for the design and position of the various components of the collecting chamber to accomodate the physical characteristics and behavioral patterns of the insect of interest. For example, the numbers, sizes, and positions of the entrance and exit apertures may be adjustable for selective access or escape and suitable structure may be provided to protect the interior of the device from the elements.

In accordance with this discovery, it is an object of the invention to provide a device for facilitating the dissemination of active agents by insects.

Another object of the invention is to provide a device for autoinoculation of insects with microorganisms useful as entomopathogens, biocompetitors and weed control agents.

A further object of the invention is to adapt an insect autoinoculator to a standard funnel-type insect trap.

Still another object of the invention is to engineer a versatile autoinculating device for mechanically selecting a particular insect species for vectoring an active agent.

Other objects and advantages of the invention will become readily apparent from the ensuing description.

DETAILED DESCRIPTION OF THE INVENTION

The apparatus of this invention was designed for attracting a variety of insects and contaminating them with a preselected active agent. The terms "active agent" and "agent" are used herein to include chemical, viral, microbial agents which are useful for controlling or marking target pest species. Examples of such agents include without limitation, entomopathogens, biocompetitors, weed pathogens, active microbial cultures, spores, herbicides, markers for population monitoring, and the like. While not being limited thereto, the device is especially suited to treatment of flying insects such as flies, moths, bees and beetles. Also, it is especially suited for use with vertical drop traps, such as the windoriented funnel trap described in U.S. Pat. No. 5,081,788 which is herein incorporated by reference.

Figure 1:
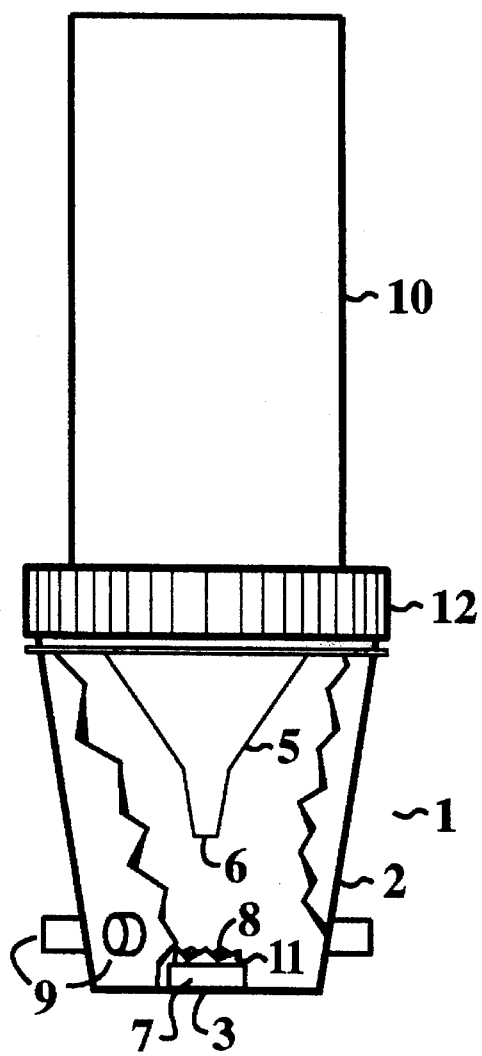
FIG. 1 shows a partially cut-away plan view of one embodiment of the autocontamination chamber of the invention having tubular exit portals.

Referring to FIG. 1, the autocontamination device comprises a chamber 1 having a sidewall 2 and a bottom 3. In the preferred embodiment, the chamber is cylindrical or frustoconical in shape. Of course, it could also be a multi-sided (e.g., prism-shaped) structure, in which case it would have a plurality of sidewalls 2. The entrance to the chamber can assume any of a variety of configurations, but generally will consist of an entry aperture 6 between the chamber 1 and a component of the insect trap to which it is attached. FIG. 1 illustrates the chamber affixed to a conduit 10 which depends from the underside of an insect trap (not shown). The conduit terminates in a funnel 5. Affixation of the chamber to the conduit can be by any convenient means, provided that the inside of the chamber is accessible for maintenance of the pathogen. The arrangement illustrated in FIG. 1 comprises a screw top ring 12 which mates with threads integrated into upper portion of sidewall 2. Alternatively, chamber 1 could be fastened to the conduit by snaps, press fit, or held by any other mechanism conventional in the art. The entry aperture 6 should be sized to permit easy one-way passage of the trapped insects into chamber 1 with minimal opportunity for return into conduit 10. For the same reason, the lip of funnel 5 should extend completely to sidewall 2, thereby forming a top wall for the chamber. In an alternative embodiment, a simple planar baffle 16 (FIG. 2) having an entry aperture 6 can be substituted for the funnel.

Beneath entry aperture 6, the chamber is provided with a surface 7 for supporting the active agent 8. Surface 7 may be the inside of bottom 3, or an elevated platform above the bottom. The agent is placed on the surface in vertical alignment below the entry aperture so that insects dropping through the entry aperture would contact the agent immediately upon entering the chamber. Optionally, the surface 7 beneath the entry aperture may be conically-shaped so as to concentrate the agent in this area. In another embodiment, surface 7 may be surrounded by a barrier 11 which serves to impede, but not prevent, movement of the insect toward the sidewall of the chamber. Detention of the insect in the vicinity of the agent would help to insure contamination.

Figure 2:
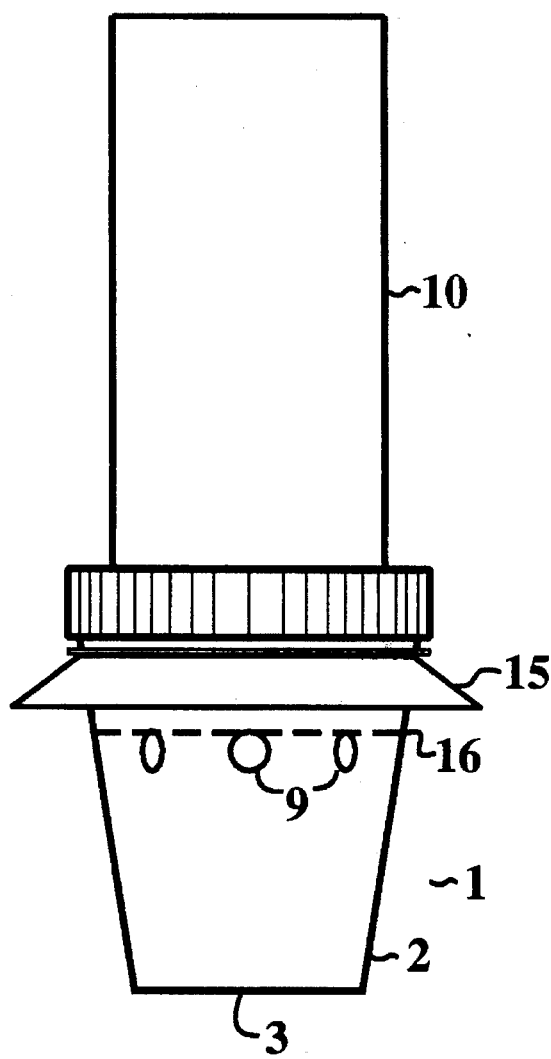

Sidewall 2 is provided with at least one exit portal 9. In a preferred embodiment of the invention illustrated in FIG. 1, there are a plurality of such exit portals spaced around the lower periphery of the chamber. In one arrangement, the portals are tubes which permit egress of the insects but which protect the inside of the chamber from rain and access by birds and other wildlife. These tubes may radiate horizontally outward from the sidewall or slope slightly downward as a further precaution against entry of rain to the chamber. The device may also be equipped with a rainfly 15 as illustrated in FIG. 2. FIG. 2 depicts an alternate embodiment wherein the exit portals are simply apertures in sidewall 2 protected by an outwardly extending baffle or rain fly 15.

Figure 3:
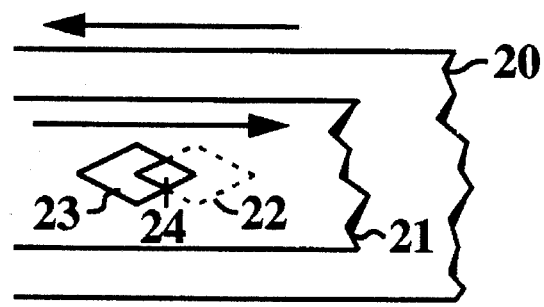

For some applications, it may be desirable to limit access to the chamber 1 and subsequent dissemination of the agent to a particular insect species or grouping of insect species. To some extent, access by undesired insects can be limited by the selectivity of attractants placed in the trap feeding the autoinoculation device. Limited access can also be accomplished by appropriate preselection of the size of entry aperture 6 and/or exit portal 9. Larger insects can be excluded by placement of a screen anywhere upstream of the entry aperture 6. It is also envisioned that the contamination device could be constructed so that the sizes of entry aperture 6 and portal 9 would be adjustable. For example, the top of the chamber could be fitted with overlapping apertured plates. When rotated relative to one another, the sizes or number of openings passing through both plates would vary. Variable aperture size could also be accomplished with an iris-like shutter mechanism. Likewise, the sidewall 2 could be equipped with a rotating sleeve having apertures in approximate alignment with the exit portals in the sidewall itself. When the sleeve is moved relative to the sidewall, the exposed cross section of the portal could be varied. FIG. 3 illustrates an adjustable opening which could be employed for either entry aperture 6 or portal 9. In that figure, members 20 and 21 are arranged so as to move in opposite directions relative to one another. One of the members could be considered to be "fixed", and the other "moveable". When cutout 23 in member 21 comes into partial or complete alignment with cutout 22 in member 20, the result is an opening 24. The size of opening 24 is of course determined by the extent of overlap of the two cutouts.

The active agent which is placed in the chamber may be in powder, liquid or gel form and may be combined with a suitable carrier, such as an inert particulate, a gel, or a paste. Examples of specific carriers include granular or gelled starch, agar, clay, diatomaceous earth and the like. For visual monitoring of contaminated insects, a dye could also be incorporated into the pathogen formulation.

In operation, the contamination device is fitted onto a trap as previously described. Insects which are captured in the trap will ultimately tend to drop directly into chamber 2 through entry aperture 6 and onto the agent 8. Contamination of the insect will normally occur by virtue of the initial contact with the agent and the escape response will eventually direct the insect to one of the exit portals 9. The behavioral pattern of the insect species targeted for contamination will, in part, dictate the number and positioning of the portals on sidewall 2. For example, the portals should be placed near the top of the chamber just below the upper lip of funnel 5 or just below baffle 16 if the targeted insect vector exhibits a climbing behavior or an upward flying behavior as with flies. The juxtaposition of the exit portals to the upper lip of funnel 5 or baffle 16 serves to prevent these insects from ascending beyond the portals and becoming effectively entrapped in the upper portion of the chamber. Some insects, such as sap beetles, would have a tendency to exit from portals near the bottom of the chamber as shown in FIG. 1. Once, the contaminated insect has exited the device, it is free to return to the environment to disseminate the agent to the target species. The sidewall of the chamber may be textured to facilitate access to the exit portals.

The following examples are intended only to further illustrate the invention and are not intended to limit the scope of the invention which is defined by the claims.

Examples

A series of experiments as set forth in Examples 1–13 was conducted using the autoinoculation device depicted in FIG. 1 (without barrier 11) to determine the efficacy of a trap designed to autoinoculate insects with biocompetitors of toxigenic fungi, insect pathogens or weed pathogens. For most trials, a dry, powdered, brilliant blue dye was used as a population dispersal indicator to represent a pest control agent. Except as otherwise indicated, the dusky sap beetle, *Carpophilus lugubris* (Coleoptera: Nitidulidae), which vectors plant pathogens such as the toxigenic fungi *Aspergillus flavus* and selectively locates damaged milk-stage corn, was used for the experiments as the test insect.

Example 1

The purpose of this experiment was to determine the amount of dye that individual insects carry on their bodies after passing through the autoinoculator device illustrated in FIG. 1. The device had been slightly modified by fitting the outside end of each of the eight exit tubes 9 with a screw-type vial cap and installing a vial on each cap. At the start of the experiment 100 mg of dye was present on the floor of the chamber beneath entry aperture 6.

Twenty-five dusky sap beetles were introduced into chamber 2 via funnel 5. As an insect entered a vial, the vial was removed, capped, and replaced with a new one. The amount of dye carried into each vial was determined using a spectrophotometer. The experiment was terminated after 90 min and repeated three times. Each trial consisted of four replicates. The results are reported in Table I, below.

TABLE I

| Trial | % Insects exiting after 90 minutes | Mean amount of dye carried out by each insect (mg) |
|---|---|---|
| 1 | 31 | 0.31 |
| 2 | 33 | 0.22 |
| 3 | 29 | 0.24 |
| | Mean: 31 | Mean: 0.26 (n = 93) |

In summary, approximately 30% of the beetles introduced into the traps exited within 90 min, carrying an average of 0.26 mg of dye per insect.

Example 2

The purpose of this experiment was to determine the number of insects which would exit the autoinoculation device of FIG. 1 placed in a wind tunnel with a wind velocity of 0.4 km/hr. to simulate field conditions. One hundred dusky sap beetles starved for 24 hrs were introduced into the chamber 2 via funnel 5. The experiment was conducted for a period of 60 min and was repeated 5 times. The results are reported in Table II, below.

TABLE II

| Replicate # | % Insects exiting the cup after 1 hr |
|---|---|
| 1 | 76 |
| 2 | 87 |
| 3 | 75 |
| 4 | 80 |
| 5 | 73 |
| | Mean: 78% |

In summary, approximately 78% of the insects placed inside the traps exited within 1 hour. The reason for a higher exit rate in comparison to that observed in Example 1 could be due to air movement in the wind tunnel. The dusky sap beetle tends to be more active when air currents are prevalent. Starvation could also result in increased insect movement, accounting for higher exit rates from the trap.

Example 3

The purpose of this experiment was to determine the number of insects exiting the autoinoculator of FIG. 1 containing different in powder form. Two commercial, powdered formulations of fungal biocompetitors, *Trichoderma harzianum* and *T. polysporum* (marketed as Binab T by Binab USA) and *Bacillus subcilis* concentrate (marketed as Kodiak™ by Gustafson, Inc.) were used. The insect pathogens *Bacillus thuringiensis* var. *kurscaki* (marketed as Dipel by Abbott Labs.), and *Beauveria bassiana* were also used. Twenty-five dusky sap beetles were released into each of three chambers containing 100 mg of each organism (3 cups per treatment). The results are reported in Table III, below.

TABLE III

| MICROORGANISM | % insects exiting in 1 hr |
|---|---|
| *Trichoderma spp.* | |
| Rep. 1 | 40 |
| Rep. 2 | 60 |
| Rep. 3 | 72 |
| | Mean: 57% |
| *Bacillus subtilis* | |
| Rep. 1 | 92 |
| Rep. 2 | 96 |
| Rep. 3 | 36 |
| | Mean: 75% |
| *Bacillus thuringiensis* | |
| Rep. 1 | 52 |
| Rep. 2 | 52 |
| Rep. 3 | 52 |
| | Mean: 52% |
| *Beauveria bassiana* | |
| Rep. 1 | 44 |
| Rep. 2 | 32 |
| Rep. 3 | 52 |
| | Mean: 43% |

Example 4

The purpose of this experiment was to determine the amount of material carried by insects as they exit the autoinoculation device of FIG. 1. Active agents used were the same as in Example 3. Forty dusky sap beetles were released in each device containing 100 mg of pathogen (one chamber per treatment) and the first 15 insects exiting the device were collected in vials as described in Example 1. The amount of pathogen carried into the vial was determined as follows: 1 ml of "Triton-X" 0.01% (wetting agent) was added to the vial containing the insect and vortexed to dislodge pathogen from the insect followed by transfer of the solution to a weighed vial. The solution was then evaporated to dryness in an oven over a period of 24 hrs and the dry weight of the pathogen determined, corrected for the weight of "Triton-X". The results are reported in Table IV, below.

TABLE IV

| Microorganism | Mean amount carried per insect (mg) |
|---|---|
| *Trichoderma spp.* | 0.13 |
| *Bacillus subtilis* | 0.09 |
| *Bacillus thuringiensis* | 0.07 |
| *Beauveria bassiana* | 0.07 |

Example 5

An experiment was conducted to determine whether insects exiting an autoinoculator containing fungal entomopathogen *Beauveria bassiana*, would carry this organism to entomopathogen-free insects. The experiment was conducted in an acrylic cage in the laboratory. Ten dusky sap beetles were released inside a funnel connected to the autoinoculator while on the opposite end of the cage a funnel was attached to a cup containing the insect's pheromone and host attractant complement in addition to 10 marked sap beetles. A sporulating culture of the entomopathogen, [originally collected from the Illinois River Sand Field (University of Illinois) near Kilbourne, Ill.) growing in potato dextrose agar, was used as an inoculum source in the autoinoculator. Air was extracted by suction from the autoinoculator end of the cage, thereby creating a current of attractant from one end of the cage to the other. Beetles exiting the autoinoculator followed this current to its source, where they came in contact with the marked insects.

The experiment was run twice. Counts were taken on the number of unmarked sap beetles entering the cup containing the marked insects, the number of marked insects which died, and the number of cadavers of marked insects which exhibited growth of *Beauveria bassiana*.

Of the insects released in the autoinoculator, 95% had entered the cup containing the marked insects in 2.5 hrs. Mean mortality of marked insects was 11%, 33%, and 78% at days 5, 10, and 15, respectively, after experiment initiation. On day 17, 76% of the marked insects cadavers showed *Beauveria bassiana* growth. None of the controls exhibited fungal growth.

These results show that sap beetles can carry an entomopathogen from the autoinoculator to other insects, therefore increasing insect mortality rates in the population.

The field trials of Examples 6–10 were conducted in the Illinois River Sand Field (University of Illinois) near Kilbourne, Ill.

Example 6

Wind-oriented traps as described in U.S. Pat. No. 5,081,788 and fitted with autoinoculation devices of FIG. 1 were used in a field study to determine the amount of dye carried away by insects. One hundred mg of dye was placed on the bottom of the chamber below the aperture in the funnel in each of twelve devices attached to baited traps. Traps were located approximately 3 m from rows of field corn, thus allowing entry by insects under natural conditions. The eight exit tubes in each chamber were capped with vials to prevent insects from escaping. This permitted insects to retreat into the chamber and return to the vial, allowing them to come in contact with dye several times. The amount of dye remaining in each vial was determined using a spectrophotometer. This experiment was conducted on each of two dates, each with 12 replicates. The results are given in Table V, below.

TABLE V

| Trial | Days | % Of dye carried into vials (of original amount placed in chambers. 1200 mg) |
|---|---|---|
| 1 | 4 | 25 (301 mg) |
| 2 | 3 | 14 (164 mg) |
| | | Mean: 19.5% |

In Trial 1, a total of 494 insects was collected, equivalent to 42 insects per chamber or 0.61 mg dye per insect. In Trial 2, a total of 229 insects was collected, equivalent to 19 insects per chamber or 0.72 mg dye per insect. Of the original amount of dye placed in the chambers, approximately 20% (465 mg) was carried into vials by insects.

Example 7

This experiment was designed to determine if dye placed inside the autoinoculation chambers is carried to damaged corn ears by insects entering and exiting the traps. Field corn ears in the milk stage were damaged with pruning shears. The experiment was conducted on 8 different dates spaced 3 or 4 days apart with 12 replicates on each date. Beginning with the experiment on the fifth date, a pheromone-containing septum was placed in the damaged ear. This was done to increase the chances for insects that had come in contact with dye to find the damaged ear. Placement of a pheromone septum mimics natural situations in which insects aggregate in damaged ears and start producing pheromones. On each date 25 insects were placed in each trap with 100 mg of dye. Insects in the field were also able to enter the trap and exit on their own accord. On a given day, the percentage of ears contaminated with dye ranged from 0–58%, with the 58% rate occuring on ears treated with pheromone. The mean contamination rate for the eight day experiment was 14%.

Example 8

An experiment was conducted to obtain an estimate of the number of sap beetles that were entering the traps, and to determine if, and how far, dye was being carried from the dye-containing autoinoculators to the traps used to monitor sap beetle populations. Eight dye-free traps baited with pheromone plus fermenting bread dough were placed around the perimeter of the 40-acre field within which 12 dye-containing autoinoculator devices had been placed. The traps used to monitor populations did not allow insects to escape; insects were monitored weekly. It was determined that the 12 autoinoculation devices placed well within the center of the 40-acre test plot were sufficient to contaminate enough insects so that dye could be detected in most of the appropriately baited traps around the perimeter. Over the course of the 4-week test period, an average of 93.8% of these eight perimeter traps contained dye. Based on the presence of dye in 16 traps baited with only host attractant (no pheromone) surrounding the 40-acre area and on the number of insects collected in these, it was found that approximately 5–10% of the sap beetle population was picking up the dye. The largest distance between an autoinoculator containing dye and a trap in which dye was recovered was approximately 600 m.

Example 9

The purpose of this study was to determine whether insects would transfer dye from the autoinoculation device to corn ears late in the season. Damaged sweet corn ears were placed inside traps located ca. 3 m away from the device containing dye. This was done because suitable milk-stage field corn was no longer available in the field. The experiment was conducted on 8 different dates, each date consisting of 12 replicates. For the first two trials, 75 and 50 dusky sap beetles (100 mg of dye per 25 beetles), respectively, were introduced into each release chamber. Starting with the third trial, no insects were introduced into the chambers (which contained 500 mg dye) to simulate field conditions where insects enter and exit the trap on their own. At this time, insects in the field were abundant, as they were exiting corn during the field drying stage. The results are given in Table VI, below.

TABLE VI

| Trial | % Ears containing dye<br>(# ears with dye given in ( )) |
|---|---|
| 1 | 8 (1) |
| 2 | 50 (6) |
| 3 | 8 (1) |
| 4 | 58 (7) |
| 5 | 33 (4) |
| 6 | 75 (9) |
| 7 | 100 (12) |
| 8 | 83 (10) |
| | Mean: 52% |

Example 10

Example 9 was repeated except apples were substituted for the corn ears. The experiment was conducted on 10 different dates with each date consisting of 12 replicates. The results are reported in Table VII, below.

TABLE VII

| Trial | % Apples containing dye<br>(# apples with dye given in ( )) |
|---|---|
| 1 | 33 (4) |
| 2 | 92 (11) |
| 3 | 100 (12) |
| 4 | 25 (3) |
| 5 | 25 (3) |
| 6 | 50 (6) |
| 7 | 33 (4) |
| 8 | 55 (6)[a] |
| 9 | 50 (6) |
| 10 | 25 (3) |
| | Mean: 49% |

[a](one trap destroyed by animals)

Example 11

This experiment was designed to illustrate the ability of sap beetles to seek out damaged corn in order to vector to the corn biocompetitors of toxigenic fungi.

An initial test using fungal biocompetitor Kodiak™ (*Bacillus subtilis*) obtained from Gustafson, Inc. was conducted in the laboratory. In the first treatment, five dusky sap beetles that had picked up *B. subtilis* from the autoinoculator were introduced in each of 24 bags containing dent corn ears in the milk stage on which three holes had been drilled. The following day, each hole was inoculated with *Aspergillus flavus*. The second treatment consisted of inoculation of each hole with *A. flavus* followed by releasing 5 sap beetles (the following day) carrying *B. subtilis* picked up from the autoinoculator in each of 23 bags. Controls consisted of ears inoculated with *A. flavus* or ears where insects carrying *B. subtilis* had been released. Ears that had *B. subtilis* introduced by sap beetles prior to *A. flavus* had less *A. flavus* than when *A. flavus* was introduced first. The results are reported in Table VIII, below.

TABLE VIII

| | Laboratory Assay | |
|---|---|---|
| | % Ears infected<br>with *A. flavus* | % Holes infected<br>with *A. flavus* |
| Treatment #1 | 97 (n = 23) | 82 |
| Treatment #2 | 59 (n = 24) | 41 |
| % reduction: | 38 | 41 |

Example 12

A preliminary field cage experiment using the autoinoculator was conducted to determine whether *B. subilis* being carried to corn ears by sap beetles would reduce *A. flavus* growth. In this test, all sweet corn ears infected with *A. flavus* prior to having insects carry the fungal biocompetitor concentrate exhibited fungal growth. In contrast, when the biocompetitor was released prior to inoculation with *A. flavus* there was no evidence of fungal growth. Insects were observed in the holes that had been drilled in sweet corn ears placed inside the cages, suggesting they were carrying the biocompetitor from the autoinoculator to the damaged corn.

Example 13

An experiment with a purpose similar to that in Example 11 was conducted in the field. Holes were drilled in dent corn ears in the milk stage. For the first series, all the ears were inoculated with *A. flavus* and the following day, half of the ears were covered (Control #1). The remaining half could then be invaded over one week by sap beetles exiting the autoinoculator containing the *B. subtilis* fungal biocompetitor (Treatment #1). The second series consisted of drilling holes in the ears, followed by 1 week of accessibility by sap beetles exiting the autoinoculator containing the biocompetitor. One week later, half of these ears were inoculated with *A. flavus* (Treatment #2) and the other half was uninoculated (Control #2). A week later, all ears were harvested. Ears that permitted access of sap beetles before adding *A. flavus* had no *A. flavus*, in contrast to those where *A. flavus* was added first.

The results reported in Table IX suggest that sap beetles can serve as vectors of fungal biocompetitors, resulting in the reduction of aflatoxin contamination in corn if the biocompetitor is delivered prior to the presence of *Aspergillus flavus*.

TABLE IX

| | Field Assay | |
|---|---|---|
| | % Ears infected with *A. flavus* | % Holes infected with *A. flavus* |
| Control #1 | 92 (n = 24) | 82 |
| Treatment #1 | 93 (n = 26) | 75 |
| Control #2 | 0 (n = 24) | 0 |
| Treatment #2 | 0 (n = 26) | 0 |

A second series of experiments described in Examples 14–18 was conducted using the autoinoculation chamber design of FIG. 2.

Example 14

The purpose of this experiment was to determine the amount of dye that individual sap beetles carry on their bodies after exiting the chamber. The experiment was conducted in the laboratory. Twenty-five dusky sap beetles were introduced through the funnel into the release chamber containing 100 mg of dye. As beetles emerged from the chamber, they were captured with a pair of tweezers and placed in individual vials. The experiment was terminated after 90 min, and repeated two times. Each trial consisted of four replicates. The amount of dye carried by each insect was determined using a spectrophotometer. The results are reported in Table X, below.

TABLE X

| Trial # | % Insects exiting after 90 minutes | Mean amount of dye carried out by each insect (mg) |
| --- | --- | --- |
| 1 | 48 | 0.18 |
| 2 | 54 | 0.14 |
|   | Mean: 51% | Overall Mean: 0.16 (n = 97) |

Example 15

The objective of this example was to determine the number of insects exiting the autoinoculator in a wind tunnel after 60 min. One hundred dusky sap beetles starved for 24 hrs were introduced into a funnel connected to an autoinoculator device. The device was attached to the underside of a wind-oriented trap placed inside the wind tunnel with a wind velocity of 0.4 Km/hr. The experiment was repeated 5 times. The results of each replicate are reported in Table XI, below.

TABLE XI

| Replicate # | % Insects exiting the cup after 1 hr in wind tunnel |
| --- | --- |
| 1 | 80 |
| 2 | 73 |
| 3 | 73 |
| 4 | 83 |
| 5 | 85 |
|   | Mean: 79% |

Example 16

The objective of this experiment was to determine the number of flies (*Musca domestica*) exiting the autoinoculator in 1 hr. Three devices were used, each containing 100 mg dye. Twenty flies temporarily immobilized by being placed in the freezer for five min were introduced into each device through a funnel. The devices were placed inside a plastic bag to facilitate counting the number of exiting flies. One hour after initiating the experiment, the bag-enclosed chamber was placed in the freezer to once again immobilize the flies until the count was taken. Flies that emerged were collected from the bags and were placed in vials. One milliliter of water was added to determine whether dye had been picked up. The results are reported in Table XII, below.

TABLE XII

| Replicate | % Flies exiting in 1 hr | % Carrying dye |
| --- | --- | --- |
| 1 | 60 | 100 |
| 2 | 50 | 100 |
| 3 | 80 | 100 |
|   | Mean: 63% |   |

Example 17

This example was similar to that of Example 16 except the test insects were fruit flies (*Drosophila melanogaster*) and the number of flies dropped into each device was 30. The experiment consisted of three trials and each trial had three replicates. To determine whether dye had been collected, flies were individually placed in a piece of white tissue paper and wetted with a drop of water. Presence of dye was indicated by the appearance of a blue color on the tissue. Of the total number of insects dropped into the chamber, 87% exited in 1 hr and 99% carried dye.

Example 18

An experiment was conducted to determine whether fall armyworm (*Spodopera frugiperda*) adult moths would exit the autoinoculator. Fifteen moths were introduced through a funnel with a large opening into each of three separate autoinoculators containing 250 mg of brilliant blue dye. The autoinoculators and funnel attachment were placed inside plastic bags for 1hr after which the number of moths exiting the autoinoculator and the percentage carrying dye were determined.

In 1 hr, 51% of the moths introduced into the autoinoculator had exited, and 100% carried dye. These results indicate that the device can be used to autoinoculate moths for the purpose of disseminating an active agent.

We claim:

1. A device adapted for use in combination with an insect trap and for disseminating an active agent by an insect comprising a chamber for collecting the insects from the trap, wherein the chamber is adapted to be secured to the underside of the trap and has the following components:
   a. a sidewall and a bottom wall;
   b. an entrance in the upper portion of the chamber for ingress of the insect from the trap;
   c. a surface in the lower portion of the chamber below the entrance for placement of the agent;
   d. at least one exit located on the sidewall of the chamber wherein said exit is a planar aperture in the sidewall or is a tube originating at the sidewall and radiating outward therefrom.

2. A device as described in claim 1 wherein the surface below the entrance is the bottom wall.

3. A device as described in claim 1 and further comprising a baffle extending radially inward from the sidewall to the entrance above the level of the exit.

4. A device as described in claim 1 and further comprising a rain fly extending radially outward from the sidewall above the level of the exit.

5. A device as described in claim 1 wherein the exit comprises a tube which extends radially outward from the sidewall.

6. A device as described in claim 1 wherein the entrance is below the level of the exit.

7. A device as described in claim 1 and further comprising means for adjusting the size of the exit.

8. A device as described in claim 7 wherein the means for adjusting the size of the exit comprises a sleeve adapted to rotate around the sidewall of the chamber and having an aperture in approximate alignment with the exit.

9. A device as described in claim 1 and further comprising means for adjusting the size of the entrance.

10. A device as described in claim 9 wherein said said means for adjusting the size of the entrance comprises overlapping apertured plates.

11. A device as described in claim 1 wherein the surface below the entrance is a component of a confinement apparatus for the agent, wherein the confinement apparatus comprises means for egress of the insect.

12. A device as described in claim 1 wherein the entrance is the terminal opening in a funnel and wherein the exit comprises a plurality of tubes extending radially outward from the sidewall in the lower portion of the chamber.

13. A device as described in claim 1 wherein the entrance is the terminal opening in a funnel, said funnel being positioned in a central opening in a baffle which extends radially inward from the sidewall in the upper portion of the chamber, wherein the exit comprises a plurality of holes in the sidewall just below and in juxtaposition to the baffle and above the level of the entrance, and wherein a rain fly extends radially outward from the sidewall above the level of the plurality of holes.

* * * * *